(12) United States Patent
Chow

(10) Patent No.: US 6,571,291 B1
(45) Date of Patent: May 27, 2003

(54) APPARATUS AND METHOD FOR VALIDATING AND UPDATING AN IP CHECKSUM IN A NETWORK SWITCHING SYSTEM

(75) Inventor: Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/562,287

(22) Filed: May 1, 2000

(51) Int. Cl.[7] .......................... G06F 15/16; H04L 12/28
(52) U.S. Cl. ...................... 709/230; 709/236; 370/392; 370/389
(58) Field of Search .............................. 709/230, 236; 370/392, 389

(56) References Cited

U.S. PATENT DOCUMENTS

| | | | |
|---|---|---|---|
| 5,953,335 A | | 9/1999 | Erimli et al. |
| 6,128,666 A | * | 10/2000 | Muller et al. ............... 709/238 |
| 6,226,680 B1 | * | 5/2001 | Boucher et al. ............ 709/230 |
| 6,256,314 B1 | * | 7/2001 | Rodrig et al. ............... 370/401 |
| 6,345,302 B1 | * | 2/2002 | Bennett et al. ............. 709/236 |
| 6,389,479 B1 | * | 5/2002 | Boucher et al. ............ 709/243 |
| 6,434,620 B1 | * | 8/2002 | Boucher et al. ............ 709/230 |
| 6,449,656 B1 | * | 9/2002 | Elzur et al. ................. 709/236 |
| 6,496,505 B2 | * | 12/2002 | La Porta et al. ............ 370/392 |

OTHER PUBLICATIONS

Mallory Et Al., "Incremental Updating of the Internet Checksum", Request for Comments 1141, Network Working Group, Internet Engineering Task Force, Jan., 1990, pp. 1–2.

* cited by examiner

*Primary Examiner*—Krisna Lim
(74) *Attorney, Agent, or Firm*—Manelli Denison & Selter PLLC; Leon R. Turkevich; Edward J. Stemberger

(57) ABSTRACT

A network switching system configured for evaluating an incoming data packet including layer 3 information having an Internet Protocol (IP) header and an IP checksum. The system includes a buffer memory and network switch. The network switch includes a media access control (MAC) module having a receive data portion and a transmit data portion. The receive data portion is configured to extract the IP checksum from the IP header and to validate the IP checksum. A queue block is configured to send the IP checksum to the buffer memory for storage therein. A layer 3 internal rules checker is configured to receive layer 3 information and to modify the IP header based on a field of the IP header. The internal rules checker generates an identifier indicating the field needs to be changed. The network switch also includes a dequeue block configured to receive the identifier and to retrieve the IP checksum from the buffer memory and to incrementally update the IP checksum as a result of the change to the field, with the updated IP checksum being received by the transmit data portion of the MAC module.

14 Claims, 2 Drawing Sheets

APPARATUS AND METHOD FOR VALIDATING AND UPDATING AN IP CHECKSUM IN A NETWORK SWITCHING SYSTEM

BACKGROUND OF THE INVENTION

1. Field of The Invention

The present invention relates to layer 2 (and above) switching of data packets in a non-blocking network switch configured for switching data packets between subnetworks and more particularly to updating a layer 3 checksum as a result of modifying the corresponding layer 3 header.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 and above switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

If layer 3 information is processed at a network switch, the layer 3 checksum must be validated and updated. For example, if the "time to live" field of an IP header is decremented, the IP header content has been changed and thus, the IP checksum must be updated. Conventional implementations typically would buffer the IP header portion of a frame and recalculate the sixteen bit IP checksum in an internal rules checker of a network switch port before the IP portion of a frame is transmitted. Such an implementation, however, would require substantial resources and add substantially to the latency encountered by the data packet.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that provides validation and an incremental update of the IP checksum in real time without the need to buffer and recalculate the entire IP checksum before each IP frame is transmitted.

These and other needs are attained by the present invention, where a network switching system is configured for evaluating an incoming data packet including layer 3 information having an Internet Protocol (IP) header and an IP checksum. The system includes a buffer memory and network switch. The network switch includes a media access control (MAC) module having a receive data portion and a transmit data portion. The receive data portion is configured to extract the IP checksum from the IP header and to validate the IP checksum. A queue block is configured to send the IP checksum along with the received data frame to the buffer memory for storage therein. A layer 3 internal rules checker is configured to receive layer 3 information and to modify the IP header based on a field of the IP header. The internal rules checker generates an identifier indicating whether the field needs to be changed. The network switch also includes a dequeue block configured to receive the identifier and to retrieve the IP checksum from the buffer memory and to incrementally update the IP checksum as a result of the change to the field, with the updated IP checksum being received by the transmit data portion of the MAC module.

Another aspect of the invention provides a method of updating an IP checksum of a data packet at a network switching system. The method includes receiving, at a network switch, a data packet including layer 3 information having an Internet Protocol (IP) header and an IP checksum. The IP checksum is validated and stored in a buffer memory. The IP header is modified. The IP checksum is retrieved from the buffer memory and is incrementally updated to correspond to the modified IP header. The data packet is then transmitted from the network switch with the updated IP checksum.

Thus, the apparatus and method of the invention advantageously provides an incremental update of the IP checksum in real time which reduces memory requirements and the processing time associated with updating the IP checksum.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
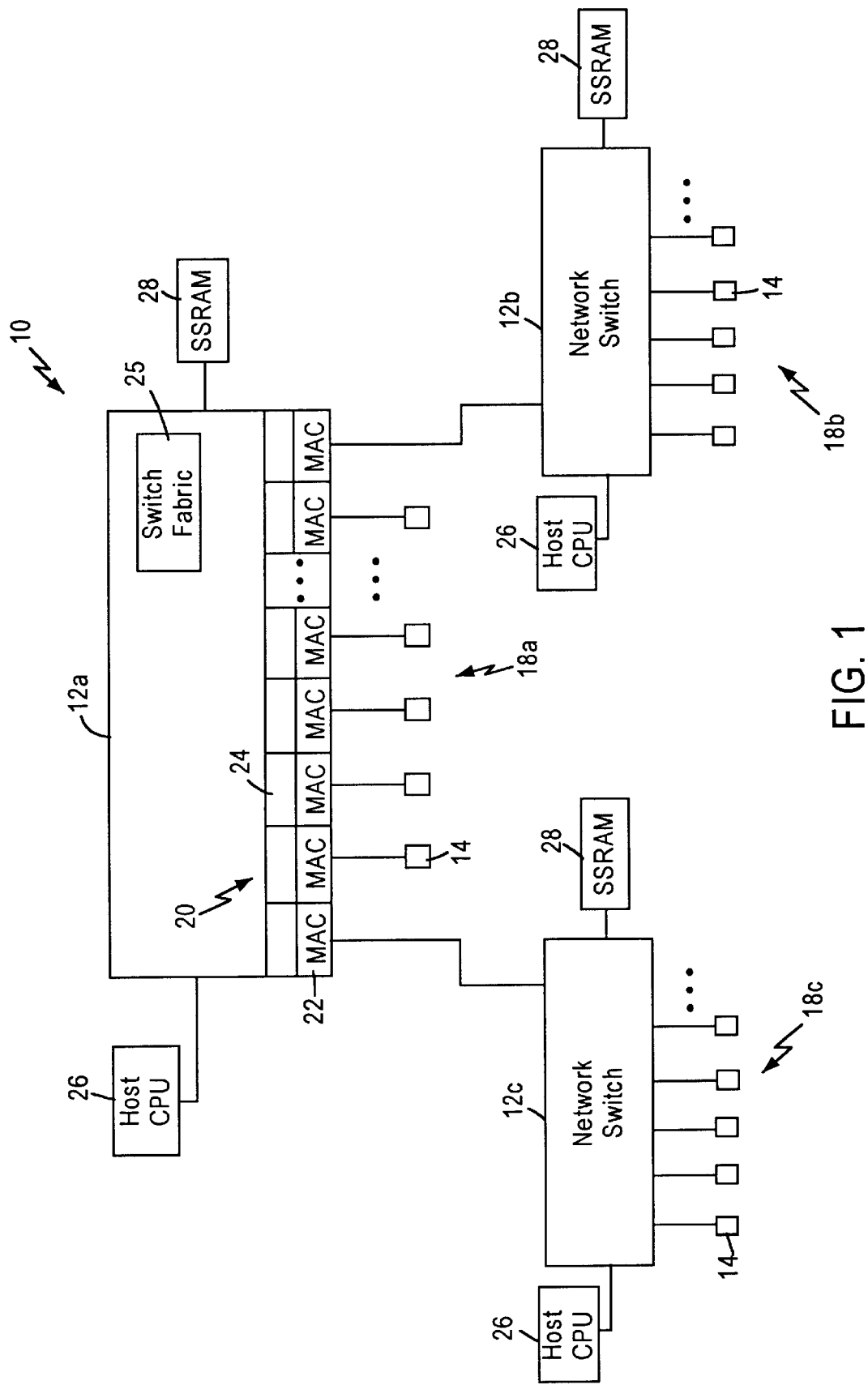
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25, also referred to as an internal rules checker (IRC), configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets. Hence, each network switching system includes a integrated switch, 12, a host CPU 26, and a buffer memory 28.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice.

Figure 2:
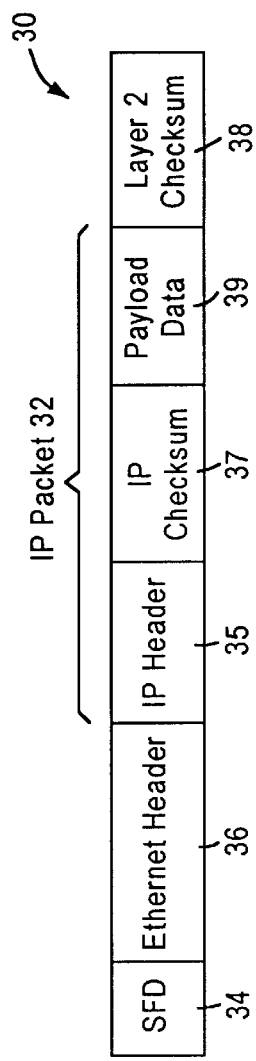
FIG. 2 is a diagram illustrating a conventional layer 2 Ethernet-type data packet carrying a layer three Internet Protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, a layer 2 checksum 38 and the IP packet 32. The IP packet 32 includes an IP header 35, an IP checksum field 37, and payload data 39.

Hence, a switch fabric 25 configured for layer 3 switching decisions needs to be able to quickly process the IP packet 32 within the received Ethernet frame 30 to avoid blocking of the frame within the switch.

According to the disclosed embodiment, the packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 3:
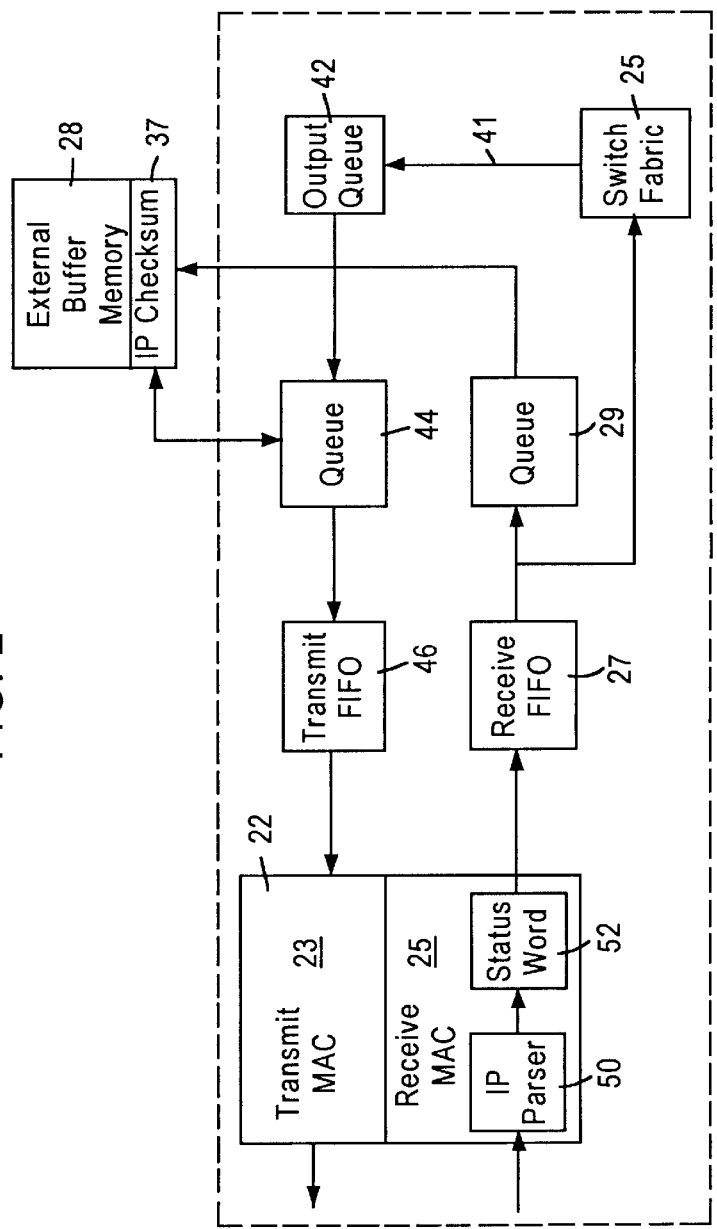
FIG. 3 is a block diagram illustrating validating and incrementally updating of the IP checksum at the switched network of FIG. 1, according to an embodiment of the present invention.

With reference to FIG. 3, the network switch 12 includes a MAC module 22 including a transmit MAC portion 23 and a receive MAC portion 25, a receive FIFO buffer 27, a queue block 42, the switch fabric 25, an output queue 42, a dequeue block 44, and a transmit FIFO buffer 46. The queue block 29 and the dequeue block 44 are configured to transfer layer 2 information to and from the external buffer memory 28.

In accordance with the disclosed embodiment, since both layer 2 and layer 3 information is contained in the incoming data packet, when the data packet is received by the receive MAC portion 25, a 16 bit IP checksum is extracted from the IP header 35 of the data packet 30 by an IP parser 50. The IP parser 50 validates the IP checksum 37 with respect to the contents of the IP header 35. The IP parser 50 also checks that the sum of the content of the IP header 35 is 16 bits all equal to 1 and if not, a checksum error signal is generated indicating the frame should be dropped. If the IP checksum 37 is determined to be invalid, an identifier is set and may be used by the switch fabric 25 to drop the frame. If the packet is determined to be valid, the IP checksum 37 is attached as a status word 52 at the end of the received packet prior to receipt at the receive FIFO 27. The status word 52 also indicates the length of the packet and whether there is an error in the packet. The location of the beginning of the IP header is also identified in the status word 52. This information is received by the receive FIFO 27 and the queue block 29. The IP checksum 37 and the location of the beginning of the IP header 60 are stored in the buffer memory 28. Relative to the IP frame, the IP checksum 37 is in the same location all the time. However, since there are different types of layer 2 data packets, the beginning of the layer 3 frame needs to be identified and is thus stored in the external memory 28.

Next, the data (e.g., MAC address, IP address) received by the receive FIFO 27 is sent to the switch fabric 25 for address look-up. The IRC 40 may need to modify the IP header, for example, to decrement the time to live field. Since the time to live field is decremented, the IP checksum must be updated. Instead of recalculating the IP checksum in the switch fabric 25, a one bit opcode or identifier 41 is sent to an output queue 42 indicating that the time to live field needs to be decremented. The opcode 41 is received by the dequeue block 44. Based on the opcode 41, the dequeue block 44 modifies the time to live field of the IP header 35 and updates the IP checksum of the IP packet. In particular, IP checksum 37 is retrieved from the external buffer memory 28 and the dequeue block 44 incrementally updates the IP checksum to reflect the decremented time to live field. The details of the incremental update of the IP checksum is disclosed in Internet Engineering Task Force RFC 1141 entitled, "Incremental Updating of the Internet Checksum". The location of the beginning of the IP header 60 is also retrieved from the external buffer memory 28, and the dequeue block 44 adds a fixed offset (10 bytes) to determine the location of the IP checksum within the IP frame. The dequeue block 44 sends the updated IP checksum to the transmit FIFO 46 and finally, the data packet with an updated IP checksum is sent to the transmit MAC portion 23.

Without the incremental update of IP checksum, the dequeue block 44 would need to buffer the entire IP header of the frame to recalculate the IP checksum before it can transmit the IP portion of the frame. The disclosed embodiment eliminates the need to provide an extra buffer of the IP header to recalculate the IP checksum and thus, reduces the memory needed to update the IP checksum. Hence, updating of the IP checksum is done incrementally in real time.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of updating an IP checksum of a data packet at a network switching system, the method comprising:

receiving, at a network switch, a data packet including layer 3 information having an Internet Protocol (IP) header and an IP checksum, validating the IP checksum, storing the IP checksum in a buffer memory, modifying the IP header, retrieving the IP checksum from the buffer memory and incrementally updating the IP checksum to correspond to the modified IP header, and transmitting the data packet with the updated IP checksum from the network switch.

2. The method according to claim 1, wherein the step of validating the IP checksum includes extracting, using an IP parser, the IP checksum from the IP header and validating the IP checksum with respect to the contents of the IP header via the IP parser.

3. The method according to claim 2, wherein the IP header is a 16 bit header and the IP parser checks the sum of the of the content of the IP header to determine if there are 16 bits all equal to 1 and if all 16 bits are not equal to 1, the IP parser identifies a checksum error.

4. The method according to claim 1, wherein modifying the IP header includes determining via an internal rules checker that a time to live field of the IP header needs to be decremented.

5. The method according to claim 4, wherein an identifier is set to indicate that the time to live field needs to be decremented.

6. The method according to claim 5, wherein the retrieving and updating step is based on the identifier.

7. The method according to claim 6, wherein the retrieving and updating step is performed in a dequeue block.

8. The method according to claim 1, further including storing the location of the beginning of the IP header in the buffer memory.

9. A network switching system configured for evaluating an incoming data packet including layer 3 information having an Internet Protocol (IP) header and an IP checksum, the system comprising:

a buffer memory, and a network switch separate comprising:

a media access control (MAC) module having a receive data portion and a transmit data portion, said receive data portion being configured to extract the IP checksum from the IP header and to validate the IP checksum, a queue block configured to send the IP checksum to the buffer memory for storage therein, a layer 3 internal rules checker configured to receive layer 3 information and to modify the IP header based on a field of the IP header, the internal rules checker generating an identifier indicating whether the field needs to be changed, and a dequeue block configured to receive the identifier and to retrieve the IP checksum from the buffer memory and to incrementally update the IP checksum as a result of the change to the field, with the updated IP checksum being received by the transmit data portion of the MAC module.

10. The network according to claim 9, wherein the identifier is a one bit identifier.

11. The network according to claim 9, wherein the field is a time to live field which is decremented.

12. The network according to claim 9, further including a transmit FIFO connected between the transmit data portion of the MAC module and the dequeue block, and a receive FIFO connected between the receive data portion of the MAC module and the queue block.

13. The network according to claim 9, wherein the receive data portion of the MAC includes an IP parser which extracts and validates the IP checksum.

14. The network according to claim 13, wherein the IP header is a 16 bit header and the IP parser checks the sum of the of the content of the IP header to determine if there are 16 bits all equal to 1 and if all 16 bits are not equal to 1, the IP parser is configured to identify a checksum error.

* * * * *